(12) United States Patent
Zhang et al.

(10) Patent No.: US 12,010,692 B2
(45) Date of Patent: Jun. 11, 2024

(54) UNICAST OR MULTICAST SIDELINK CONTROL INFORMATION SENDING METHOD AND COMMUNICATIONS DEVICE

(71) Applicant: HUAWEI TECHNOLOGIES CO., LTD., Guangdong (CN)

(72) Inventors: Jinfang Zhang, Shenzhen (CN); Hongjia Su, Shanghai (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 581 days.

(21) Appl. No.: 17/225,705

(22) Filed: Apr. 8, 2021

(65) Prior Publication Data

US 2021/0227523 A1    Jul. 22, 2021

Related U.S. Application Data

(63) Continuation of application No. PCT/CN2019/107143, filed on Sep. 21, 2019.

(30) Foreign Application Priority Data

Oct. 10, 2018    (CN) .......................... 201811180342.0

(51) Int. Cl.
*H04W 72/23*    (2023.01)
*H04W 72/121*    (2023.01)
(Continued)

(52) U.S. Cl.
CPC ......... *H04W 72/23* (2023.01); *H04W 72/121* (2013.01); *H04W 76/14* (2018.02); *H04W 4/40* (2018.02)

(58) Field of Classification Search
None
See application file for complete search history.

(56) References Cited

U.S. PATENT DOCUMENTS

| 5,121,389 A | 6/1992 | Faulkner |
| 2016/0295624 A1 | 10/2016 | Novlan et al. |

(Continued)

FOREIGN PATENT DOCUMENTS

| CN | 104412554 A | 3/2015 |
| CN | 104968056 A | 10/2015 |

(Continued)

OTHER PUBLICATIONS

Office Action issued in Indian Application No. 202127017106 dated Jun. 3, 2022, 7 pages.

(Continued)

*Primary Examiner* — Alex Skripnikov
(74) *Attorney, Agent, or Firm* — Fish & Richardson P.C.

(57) ABSTRACT

This application provides example sidelink control information sending methods and example communications devices. One example method includes sending, by a first communications device, first sub control information to a second communications device and a third communications device, where the first sub control information is scrambled by using a common scrambling sequence, the first communications device and the second communications device belong to a first communications device group, and the third communications device does not belong to the first communications device group. The first communications device can then send second sub control information to the second communications device, where the second sub control information is scrambled by using a scrambling sequence generated by using a user equipment identifier of the second communi- (Continued)

cations device or a scrambling sequence generated by using a group identifier of the first communications device group.

20 Claims, 6 Drawing Sheets

(51) Int. Cl.
*H04W 76/14* (2018.01)
*H04W 4/40* (2018.01)

(56) References Cited

U.S. PATENT DOCUMENTS

| | | | |
|---|---|---|---|
| 2017/0295559 A1 | 10/2017 | Agiwal et al. | |
| 2018/0176892 A1* | 6/2018 | Kim | H04W 52/04 |
| 2018/0278454 A1 | 9/2018 | Islam et al. | |
| 2021/0037359 A1* | 2/2021 | Lee | H04W 72/21 |

FOREIGN PATENT DOCUMENTS

| | | |
|---|---|---|
| CN | 106549738 A | 3/2017 |
| CN | 106686551 A | 5/2017 |
| CN | 107635286 A | 1/2018 |
| CN | 108347313 A | 7/2018 |
| CN | 108353406 A | 7/2018 |
| CN | 108633020 A | 10/2018 |
| EP | 3373676 A1 | 9/2018 |
| WO | 2018175553 A1 | 9/2018 |

OTHER PUBLICATIONS

Office Action issued in Chinese Application No. 202111328511.2 dated May 18, 2022, 11 pages.
Office Action in Chinese Appln. No. 202111328511.2, dated Jan. 11, 2023, 4 pages.
Extended European Search Report issued in European Application No. 19870648.3 dated Dec. 1, 2021, 10 pages.
3GPP TS 38.211 V15.3.0, "3rd Generation Partnership Project; Technical Specification Group Radio Access Network; NR; Physical Channels and Modulation (Release 15)," Sep. 2018, 96 pages.
3GPP TS 38.212 V15.3.0, "3rd Generation Partnership Project; Technical Specification Group Radio Access Network; NR; Multiplexing and Channel Coding (Release 15)," Sep. 2018, 99 pages.
3GPP TS 38.213 V15.3.0, "3rd Generation Partnership Project; Technical Specification Group Radio Access Network; NR; Physical Layer Procedures for Control (Release 15)," Sep. 2018, 101 pages.
3GPP TS 38.214 V15.3.0, "3rd Generation Partnership Project; Technical Specification Group Radio Access Network; NR; Physical Layer Procedures for Data (Release 15)," Sep. 2018, 96 pages.
3GPP TS 38.331 V15.3.0, "3rd Generation Partnership Project; Technical Specification Group Radio Access Network; NR; Radio Resource Control (RRC) Protocol Specification (Release 15)," Sep. 2018, 445 pages.
3GPP TS 38.321 V15.3.0, "3rd Generation Partnership Project; Technical Specification Group Radio Access Network; NR; Medium Access Control (MAC) Protocol Specification (Release 15)," Sep. 2018, 76 pages.
3GPP TS 36.211 V15.3.0 (Sep. 2018), "3rd Generation Partnership Project; Technical Specification Group Radio Access Network; Evolved Universal Terrestrial Radio Access (E-UTRA); Physical channels and modulation(Release 15)," Sep. 2018, 237 pages.
Huawei, Huawei Device, "Discussion on NR sidelink," 3GPP TSG RAN#75, RP-170357, Dubrovnik, Croatia, Mar. 6-9, 2017, 4 pages.
Office Action issued in Chinese Application No. 201811180342.0 dated Feb. 7, 2021, 9 pages (with English translation).
PCT International Search Report and Written Opinion issued in International Application No. PCT/CN2019/107143 dated Nov. 29, 2019, 17 pages (with English translation).

* cited by examiner

UNICAST OR MULTICAST SIDELINK CONTROL INFORMATION SENDING METHOD AND COMMUNICATIONS DEVICE

CROSS-REFERENCE TO RELATED APPLICATIONS

This application is a continuation of International Application No. PCT/CN2019/107143, filed on Sep. 21, 2019, which claims priority to Chinese Patent Application No. 201811180342.0, filed on Oct. 10, 2018. The disclosures of the aforementioned applications are hereby incorporated by reference in their entireties.

TECHNICAL FIELD

Embodiments of this application relate to a communications system, and in particular, to a unicast or multicast sidelink control information sending method and a communications device.

BACKGROUND

Device-to-device (Device to Device, D2D) communication, vehicle-to-vehicle (Vehicle to Vehicle, V2V) communication, vehicle-to-pedestrian V2P (Vehicle to Pedestrian, V2P) communication, or vehicle-to-infrastructure/network V2I/N (Vehicle to Infrastructure/Network, V2I/N) communication is a technology for direct communication between terminal devices (terminal device). Direct transmission between terminal devices is defined as sidelink (Sidelink, SL) transmission. V2V, V2P, and V2I/N are collectively referred to as V2X, to be specific, a vehicle communicates with everything.

In an example of V2X communication, a terminal device may perform control information and data communication with another terminal device. In the V2X communication, sidelink control information does not include an identifier of a receive end device. Therefore, unicast and multicast transmission and physical layer hybrid automatic repeat request (Hybrid Automatic Repeat Request, HARQ) transmission cannot be performed. In addition, a downlink control Information (Downlink Control Information, DCI) in the V2X communication is scrambled by using a scrambling sequence generated by using the identifier of the receive end device. If the technology is reused for unicast and multicast sidelink control information transmission, only the receive end device can perform decoding, and another terminal device cannot perform decoding. When performing autonomous resource selection beyond network coverage, the terminal device cannot obtain a resource usage and reservation status of the another terminal device.

SUMMARY

Embodiments of this application provide a unicast or multicast sidelink control information sending method, a communications device, and a communications system, so that a terminal device can obtain a resource usage and reservation status of another terminal device when performing autonomous resource selection beyond network coverage.

According to a first aspect, a sidelink control information sending method is provided. The method may be performed by a first communications device or a chip in a first communications device, and includes: The first communications device sends first sub control information to a second communications device and a third communications device, where the first sub control information is scrambled by using a common scrambling sequence, the first communications device and the second communications device belong to a first communications device group, the third communications device does not belong to the first communications device group, the first sub control information belongs to first sidelink control information, the first sidelink control information is used to indicate the first communications device to send first sidelink data to the second communications device, the first sub control information includes transmission resource indication information of the first sidelink data, and the transmission resource indication information of the first sidelink data is used to indicate a resource used by the first communications device to send the first sidelink data; and the first communications device sends second sub control information to the second communications device, where the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

According to this embodiment of this application, the first communications device scrambles the first sub control information by using the common sequence, so that the third communications device can perceive a resource usage and reservation status of the first communications device. The second sub control information is scrambled by using the user equipment identifier of the second communications device or the group identifier of the first communications device group, and can indicate the second communications device to receive data. In this way, unicast and multicast transmission and HARQ transmission can be supported, and perception of a resource usage and reservation status when autonomous resource selection is performed beyond network coverage can be supported.

In a possible design, the first sub control information includes at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and the second sub control information includes at least one piece of information in a modulation and coding scheme, a new data indicator, a transmission mode, a reserved information bit, a hybrid automatic repeat request process number, or a channel state feedback indicator. In this way, specific content of the first sub control information and the second sub control information is provided.

In a possible design, the first communications device receives a unicast communication link establishment request from the second communications device, where the unicast communication link establishment request includes the user equipment identifier of the second communications device; and the first communications device sends unicast communication link establishment acknowledgment information to the second communications device, where the unicast communication link establishment acknowledgment information includes a user equipment identifier of the first communications device; or the first communications device sends a unicast communication link establishment request to the second communications device, where the unicast communication link establishment request includes a user equipment identifier of the first communications device; and the first communications device receives unicast communication link establishment acknowledgment information from the second communications device, where the unicast communication link establishment acknowledgment information includes the user equipment identifier of the second communications device. In this way, a process in which the first communications device and the second communications device establish a unicast link is provided.

In a possible design, the first communications device receives first communications device group joining request information from the second communications device, where the first communications device group joining request information includes the user equipment identifier of the second communications device; and the first communications device sends first communications device group joining acknowledgment information to the second communications device, where the first communications device group joining acknowledgment information includes the group identifier of the first communications device group and a user equipment identifier of the first communications device; or the first communications device sends first communications device group joining request information to the second communications device, where the first communications device group joining request information includes a user equipment identifier of the first communications device; and the first communications device receives first communications device group joining acknowledgment information from the second communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the second sub control information is scrambled by using the scrambling sequence generated by using the user equipment identifier of the second communications device; or communication between the first communications device and the second communications device is multicast transmission, and the second sub control information is scrambled by using the scrambling sequence generated by using the group identifier of the first communications device group. In this way, cases in which the second sub control information is separately scrambled by using the device identifier or the group identifier during the unicast transmission and the multicast transmission are provided, to implement the unicast transmission and the multicast transmission.

In a possible design, the first communications device receives first downlink control information from a network device, where the first downlink control information is used to indicate a first resource, and the first resource includes a second resource and a third resource; or the first communications device selects a first resource from a resource pool, where the first resource includes a second resource and a third resource; that the first communications device sends first sub control information to a second communications device and a third communications device includes: the first communications device sends the first sub control information to the second communications device and the third communications device on the second resource; and that the first communications device sends second sub control information to the second communications device includes: the first communications device sends the second sub control information to the second communications device on the third resource. In this way, a process in which the first communications device obtains the second resource and the third resource is provided, and the first sub control information and the second sub control information are sent on the second resource and the third resource respectively.

According to a second aspect, a sidelink control information sending method is provided. The method may be performed by a second communications device or a chip in a second communications device, and includes: The second communications device receives first sub control information from a first communications device, where the first sub control information is scrambled by using a common scrambling sequence, the first communications device and the second communications device belong to a first communications device group, the first sub control information belongs to first sidelink control information, the first sidelink control information is used to indicate the first communications device to send first sidelink data to the second communications device, the first sub control information includes transmission resource indication information of the first sidelink data, and the transmission resource indication information of the first sidelink data is used to indicate a resource used by the first communications device to send the first sidelink data; and the second communications device receives second sub control information from the first communications device, where the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

According to this embodiment of this application, the first sub control information is scrambled by using the common sequence, and the second sub control information is scrambled by using the user equipment identifier of the second communications device or the group identifier of the first communications device group, and can indicate the second communications device to receive data. In this way, unicast and multicast transmission and HARQ transmission can be supported, and perception of a resource usage and reservation status when autonomous resource selection is performed beyond network coverage can be supported.

In a possible design, the first sub control information includes at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and the second sub control information includes at least one piece of information in a modulation and coding scheme, a new data indicator, a transmission mode, a reserved information bit, a hybrid automatic repeat request process number, or a channel state feedback indicator. In this way, specific content of the first sub control information and the second sub control information is provided.

In a possible design, the second communications device sends a unicast communication link establishment request to the first communications device, where the unicast communication link establishment request includes the user equipment identifier of the second communications device; and the second communications device receives unicast communication link establishment acknowledgment information from the first communications device, where the unicast communication link establishment acknowledgment information includes a user equipment identifier of the first communications device; or the second communications device receives a unicast communication link establishment request from the first communications device, where the unicast communication link establishment request includes a user equipment identifier of the first communications device; and the second communications device sends unicast communication link establishment acknowledgment information to the first communications device, where the unicast communication link establishment acknowledgment information includes the user equipment identifier of the second communications device. In this way, a process in which the first communications device and the second communications device establish a unicast link is provided.

In a possible design, the second communications device receives first communications device group joining request information from the first communications device, where the first communications device group joining request information includes a user equipment identifier of the first communications device; and the second communications device sends first communications device group joining acknowledgment information to the first communications device, where the first communications device group joining acknowledgment information includes the group identifier of the first communications device group and the user equipment identifier of the second communications device; or the second communications device sends first communications device group joining request information to the first communications device, where the first communications device group joining request information includes the user equipment identifier of the second communications device; and the second communications device receives first communications device group joining acknowledgment information from the first communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the second sub control information is scrambled by using the scrambling sequence generated by using the user equipment identifier of the second communications device; or communication between the first communications device and the second communications device is multicast transmission, and the second sub control information is scrambled by using the scrambling sequence generated by using the group identifier of the first communications device group. In this way, cases in which the second sub control information is separately scrambled by using the device identifier and the group identifier during the unicast transmission and the multicast transmission are provided, to implement the unicast transmission and the multicast transmission.

According to a third aspect, a sidelink control information sending method is provided. The method may be performed by a third communications device or a chip in a third communications device, and includes: The third communications device receives first sub control information from a first communications device, where the first sub control information is scrambled by using a common scrambling sequence, the first communications device belongs to a first communications device group, the third communications device does not belong to the first communications device group, the first sub control information belongs to first sidelink control information, the first sidelink control information is used to indicate the first communications device to send first sidelink data to a second communications device, the first sub control information includes transmission resource indication information of the first sidelink data, and the transmission resource indication information of the first sidelink data is used to indicate a resource used by the first communications device to transmit the first sidelink data; and the third communications device determines a fourth resource based on the first sub control information, where the fourth resource includes a resource used by the first communications device to send the first sidelink data.

According to this embodiment of this application, the first sub control information is scrambled by using the common sequence, and the third communications device can perceive a resource usage and reservation status of the first communications device by decoding the first sub control information.

In a possible design, the first sub control information includes at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index. In this way, specific content of the first sub control information is provided.

In a possible design, the third communications device determines a fifth resource in a resource pool based on the fourth resource, where the fifth resource does not include the fourth resource, and the fifth resource is used by the third communications device to transmit sidelink information. In this way, when performing autonomous resource selection beyond network coverage, the third communications device can select, from the resource pool based on the perceived fourth resource, the fifth resource used to transmit the sidelink information.

In a possible design, the third communications device sends first indication information to a network device, where the first indication information is used to indicate the fourth resource. In this way, the network device can learn of the fourth resource, to perform better resource scheduling.

According to a fourth aspect, a first communications device is provided. The device includes: a sending unit, configured to send first sub control information to a second communications device and a third communications device, where the first sub control information is scrambled by using a common scrambling sequence, the first communications device and the second communications device belong to a first communications device group, the third communications device does not belong to the first communications device group, the first sub control information belongs to first sidelink control information, the first sidelink control information is used to indicate the first communications device to send first sidelink data to the second communications device, the first sub control information includes transmission resource indication information of the first sidelink data, and the transmission resource indication information of the first sidelink data is used to indicate a resource used by the first communications device to send the first sidelink data; and the sending unit is further configured to send second sub control information to the second communications device, where the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

According to this embodiment of this application, the first communications device scrambles the first sub control information by using the common sequence, so that the third communications device can perceive a resource usage and reservation status of the first communications device. The second sub control information is scrambled by using the user equipment identifier of the second communications device or the group identifier of the first communications device group, and can indicate the second communications device to receive data. In this way, unicast and multicast transmission and HARQ transmission can be supported, and perception of a resource usage and reservation status when autonomous resource selection is performed beyond network coverage can be supported.

In a possible design, the first sub control information includes at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and the second sub control information includes at least one piece of information in a modulation and coding scheme, a new data indicator, a transmission mode, a reserved information bit, a hybrid automatic repeat request process number, or a channel state feedback indicator. In this way, specific content of the first sub control information and the second sub control information is provided.

In a possible design, the first communications device further includes a receiving unit, configured to receive a unicast communication link establishment request from the second communications device, where the unicast communication link establishment request includes the user equipment identifier of the second communications device; and the sending unit is configured to send unicast communication link establishment acknowledgment information to the second communications device, where the unicast communication link establishment acknowledgment information includes a user equipment identifier of the first communications device; or the sending unit sends a unicast communication link establishment request to the second communications device, where the unicast communication link establishment request includes a user equipment identifier of the first communications device; and the receiving unit receives unicast communication link establishment acknowledgment information from the second communications device, where the unicast communication link establishment acknowledgment information includes the user equipment identifier of the second communications device. In this way, a process in which the first communications device and the second communications device establish a unicast link is provided.

In a possible design, the receiving unit receives first communications device group joining request information from the second communications device, where the first communications device group joining request information includes the user equipment identifier of the second communications device; and the sending unit sends first communications device group joining acknowledgment information to the second communications device, where the first communications device group joining acknowledgment information includes the group identifier of the first communications device group and a user equipment identifier of the first communications device; or the sending unit sends first communications device group joining request information to the second communications device, where the first communications device group joining request information includes a user equipment identifier of the first communications device; and the receiving unit receives first communications device group joining acknowledgment information from the second communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the second sub control information is scrambled by using the scrambling sequence generated by using the user equipment identifier of the second communications device; or communication between the first communications device and the second communications device is multicast transmission, and the second sub control information is scrambled by using the scrambling sequence generated by using the group identifier of the first communications device group. In this way, cases in which the second sub control information is separately scrambled by using the device identifier or the group identifier during the unicast transmission and the multicast transmission are provided, to implement the unicast transmission and the multicast transmission.

In a possible design, the receiving unit receives first downlink control information from a network device, where the first downlink control information is used to indicate a first resource, and the first resource includes a second resource and a third resource; or the first communications device further includes a processing unit, where the processing unit selects a first resource from a resource pool, and the first resource includes a second resource and a third resource; that a sending unit sends first sub control information to a second communications device and a third communications device includes: the sending unit sends the first sub control information to the second communications device and the third communications device on the second resource; and that the sending unit sends second sub control information to the second communications device includes: the sending unit sends the second sub control information to the second communications device on the third resource. In this way, a process in which the first communications device obtains the second resource and the third resource is provided, and the first sub control information and the second sub control information are sent on the second resource and the third resource respectively.

According to a fifth aspect, a second communications device is provided. The device includes a receiving unit, configured to receive first sub control information from a first communications device, where the first sub control information is scrambled by using a common scrambling sequence, the first communications device and the second communications device belong to a first communications device group, the first sub control information belongs to first sidelink control information, the first sidelink control information is used to indicate the first communications device to send first sidelink data to the second communications device, the first sub control information includes transmission resource indication information of the first sidelink data, and the transmission resource indication information of the first sidelink data is used to indicate a resource used by the first communications device to send the first sidelink data; and the receiving unit is further configured to receive second sub control information from the first communications device, where the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

According to this embodiment of this application, the first sub control information is scrambled by using the common sequence, and the second sub control information is scrambled by using the user equipment identifier of the second communications device or the group identifier of the first communications device group, and can indicate the second communications device to receive data. In this way, unicast and multicast transmission and HARQ transmission can be supported, and perception of a resource usage and reservation status when autonomous resource selection is performed beyond network coverage can be supported.

In a possible design, the first sub control information includes at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and the second sub control information includes at least one piece of information in a modulation and coding scheme, a new data indicator, a transmission mode, a reserved information bit, a hybrid automatic repeat request process number, or a channel state feedback indicator. In this way, specific content of the first sub control information and the second sub control information is provided.

In a possible design, the second communications device further includes a sending unit, configured to send a unicast communication link establishment request to the first communications device, where the unicast communication link establishment request includes the user equipment identifier of the second communications device; and the receiving unit is configured to receive unicast communication link establishment acknowledgment information from the first communications device, where the unicast communication link establishment acknowledgment information includes a user equipment identifier of the first communications device; or the receiving unit is configured to receive a unicast communication link establishment request from the first communications device, where the unicast communication link establishment request includes a user equipment identifier of the first communications device; and the sending unit is configured to send unicast communication link establishment acknowledgment information to the first communications device, where the unicast communication link establishment acknowledgment information includes the user equipment identifier of the second communications device. In this way, a process in which the first communications device and the second communications device establish a unicast link is provided.

In a possible design, the receiving unit is configured to receive first communications device group joining request information from the first communications device, where the first communications device group joining request information includes a user equipment identifier of the first communications device; and the sending unit is configured to send first communications device group joining acknowledgment information to the first communications device, where the first communications device group joining acknowledgment information includes the group identifier of the first communications device group and the user equipment identifier of the second communications device; or the sending unit is configured to send first communications device group joining request information to the first communications device, where the first communications device group joining request information includes the user equipment identifier of the second communications device; and the receiving unit is configured to receive first communications device group joining acknowledgment information from the first communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the second sub control information is scrambled by using the scrambling sequence generated by using the user equipment identifier of the second communications device; or communication between the first communications device and the second communications device is multicast transmission, and the second sub control information is scrambled by using the scrambling sequence generated by using the group identifier of the first communications device group. In this way, cases in which the second sub control information is separately scrambled by using the device identifier and the group identifier during the unicast transmission and the multicast transmission are provided, to implement the unicast transmission and the multicast transmission.

According to a sixth aspect, a third communications device is provided. The device includes: a receiving unit, configured to receive first sub control information from a first communications device, where the first sub control information is scrambled by using a common scrambling sequence, the first communications device belongs to a first communications device group, the third communications device does not belong to the first communications device group, the first sub control information belongs to first sidelink control information, the first sidelink control information is used to indicate the first communications device to send first sidelink data to a second communications device, the first sub control information includes transmission resource indication information of the first sidelink data, and the transmission resource indication information of the first sidelink data is used to indicate a resource used by the first communications device to transmit the first sidelink data; and a processing unit, configured to determine a fourth resource based on the first sub control information, where the fourth resource includes a resource used by the first communications device to send the first sidelink data.

According to this embodiment of this application, the first sub control information is scrambled by using the common sequence, and the third communications device can perceive a resource usage and reservation status of the first communications device by decoding the first sub control information.

In a possible design, the first sub control information includes at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index. In this way, specific content of the first sub control information is provided.

In a possible design, the processing unit is further configured to determine a fifth resource in a resource pool based on the fourth resource, where the fifth resource does not include the fourth resource, and the fifth resource is used by the third communications device to transmit sidelink information. In this way, when performing autonomous resource selection beyond network coverage, the third communications device can select, from the resource pool based on the perceived fourth resource, the fifth resource used to transmit the sidelink information.

In a possible design, the third communications device further includes a sending unit, configured to send first indication information to a network device, where the first indication information is used to indicate the fourth resource. In this way, the network device can learn of the fourth resource, to perform better resource scheduling.

According to a seventh aspect, a sidelink control information sending method is provided. The method may be performed by a first communications device or a chip in a first communications device, and includes: The first communications device sends sidelink control information to a second communications device, where the first communications device and the second communications device belong to a first communications device group, and the sidelink control information includes a user equipment identifier of the second communications device or a group identifier of the first communications device group.

In a possible design, the first communications device receives a unicast communication link establishment request from the second communications device, where the unicast communication link establishment request includes the user equipment identifier of the second communications device; and the first communications device sends unicast communication link establishment acknowledgment information to the second communications device, where the unicast communication link establishment acknowledgment information includes a user equipment identifier of the first communications device; or the first communications device sends a unicast communication link establishment request to the second communications device, where the unicast communication link establishment request includes a user equipment identifier of the first communications device; and the first communications device receives unicast communication link establishment acknowledgment information from the second communications device, where the unicast communication link establishment acknowledgment information includes the user equipment identifier of the second communications device. In this way, a process in which the first communications device and the second communications device establish a unicast link is provided.

In a possible design, the first communications device receives first communications device group joining request information from the second communications device, where the first communications device group joining request information includes the user equipment identifier of the second communications device; and the first communications device sends first communications device group joining acknowledgment information to the second communications device, where the first communications device group joining acknowledgment information includes the group identifier of the first communications device group and a user equipment identifier of the first communications device; or the first communications device sends first communications device group joining request information to the second communications device, where the first communications device group joining request information includes a user equipment identifier of the first communications device; and the first communications device receives first communications device group joining acknowledgment information from the second communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the sidelink control information includes the user equipment identifier of the second communications device; or communication between the first communications device and the second communications device is multicast transmission, and the sidelink control information includes the group identifier of the first communications device group. In this way, the unicast transmission and the multicast transmission are implemented.

According to an eighth aspect, a sidelink control information sending method is provided. The method may be performed by a second communications device or a chip in a second communications device, and includes: The second communications device receives sidelink control information from a first communications device, where the first communications device and the second communications device belong to a first communications device group, and the sidelink control information includes a user equipment identifier of the second communications device or a group identifier of the first communications device group.

In a possible design, the second communications device sends a unicast communication link establishment request to the first communications device, where the unicast communication link establishment request includes the user equipment identifier of the second communications device; and the second communications device receives unicast communication link establishment acknowledgment information from the first communications device, where the unicast communication link establishment acknowledgment information includes a user equipment identifier of the first communications device; or the second communications device receives a unicast communication link establishment request from the first communications device, where the unicast communication link establishment request includes a user equipment identifier of the first communications device; and the second communications device sends unicast communication link establishment acknowledgment information to the first communications device, where the unicast communication link establishment acknowledgment information includes the user equipment identifier of the second communications device. In this way, a process in which the first communications device and the second communications device establish a unicast link is provided.

In a possible design, the second communications device receives first communications device group joining request information from the first communications device, where the first communications device group joining request information includes a user equipment identifier of the first communications device; and the second communications device sends first communications device group joining acknowledgment information to the first communications device, where the first communications device group joining acknowledgment information includes the group identifier of the first communications device group and the user equipment identifier of the second communications device; or the second communications device sends first communications device group joining request information to the first communications device, where the first communications device group joining request information includes the user equipment identifier of the second communications device; and the second communications device receives first communications device group joining acknowledgment information from the first communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the sidelink control information includes the user equipment identifier of the second communications device; or communication between the first communications device and the second communications device is multicast transmission, and the sidelink control information includes the group identifier of the first communications device group. In this way, the unicast transmission and the multicast transmission are implemented.

According to a ninth aspect, a first communications device is provided. The device includes: a sending unit, configured to send sidelink control information to a second communications device, where the first communications device and the second communications device belong to a first communications device group, and the sidelink control information includes a user equipment identifier of the second communications device or a group identifier of the first communications device group.

In a possible design, the first communications device further includes a receiving unit, configured to receive a unicast communication link establishment request from the second communications device, where the unicast communication link establishment request includes the user equipment identifier of the second communications device; and the sending unit is configured to send unicast communication link establishment acknowledgment information to the second communications device, where the unicast communication link establishment acknowledgment information includes a user equipment identifier of the first communications device; or the sending unit sends a unicast communication link establishment request to the second communications device, where the unicast communication link establishment request includes a user equipment identifier of the first communications device; and the receiving unit receives unicast communication link establishment acknowledgment information from the second communications device, where the unicast communication link establishment acknowledgment information includes the user equipment identifier of the second communications device. In this way, a process in which the first communications device and the second communications device establish a unicast link is provided.

In a possible design, the receiving unit receives first communications device group joining request information from the second communications device, where the first communications device group joining request information includes the user equipment identifier of the second communications device; and the sending unit sends first communications device group joining acknowledgment information to the second communications device, where the first communications device group joining acknowledgment information includes the group identifier of the first communications device group and a user equipment identifier of the first communications device; or the sending unit sends first communications device group joining request information to the second communications device, where the first communications device group joining request information includes a user equipment identifier of the first communications device; and the receiving unit receives first communications device group joining acknowledgment information from the second communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the sidelink control information includes the user equipment identifier of the second communications device; or communication between the first communications device and the second communications device is multicast transmission, and the sidelink control information includes the group identifier of the first communications device group. In this way, the unicast transmission and the multicast transmission are implemented.

According to a tenth aspect, a second communications device is provided. The device includes: a receiving unit, configured to receive sidelink control information from a first communications device, where the first communications device and the second communications device belong to a first communications device group, and the sidelink control information includes a user equipment identifier of the second communications device or a group identifier of the first communications device group.

In a possible design, the second communications device further includes a sending unit, configured to send a unicast communication link establishment request to the first communications device, where the unicast communication link establishment request includes the user equipment identifier of the second communications device; and the receiving unit is configured to receive unicast communication link establishment acknowledgment information from the first communications device, where the unicast communication link establishment acknowledgment information includes a user equipment identifier of the first communications device; or the receiving unit is configured to receive a unicast communication link establishment request from the first communications device, where the unicast communication link establishment request includes a user equipment identifier of the first communications device; and the sending unit is configured to send unicast communication link establishment acknowledgment information to the first communications device, where the unicast communication link establishment acknowledgment information includes the user equipment identifier of the second communications device. In this way, a process in which the first communications device and the second communications device establish a unicast link is provided.

In a possible design, the receiving unit is configured to receive first communications device group joining request information from the first communications device, where the first communications device group joining request information includes a user equipment identifier of the first communications device; and the sending unit is configured to send first communications device group joining acknowledgment information to the first communications device, where the first communications device group joining acknowledgment information includes the group identifier of the first communications device group and the user equipment identifier of the second communications device; or the sending unit is configured to send first communications device group joining request information to the first communications device, where the first communications device group joining request information includes the user equipment identifier of the second communications device; and the receiving unit is configured to receive first communications device group joining acknowledgment information from the first communications device, where the first communications device group joining acknowledgment information includes the group identifier of the first communications device group and the user equipment identifier of the first communications device. In this way, a process in which the first communications device and the second communications device join the first communications device group is provided.

In a possible design, communication between the first communications device and the second communications device is unicast transmission, and the sidelink control information includes the user equipment identifier of the second communications device; or communication between the first communications device and the second communications device is multicast transmission, and the sidelink control information includes the group identifier of the first communications device group. In this way, the unicast transmission and the multicast transmission are implemented.

According to an eleventh aspect, an embodiment of this application provides a computer-readable storage medium. The computer-readable storage medium stores an instruction. When the instruction is run on a computer, the computer is enabled to perform the method according to any one of the foregoing aspects.

According to a twelfth aspect, an embodiment of this application provides a computer program product. The program product stores a computer software instruction used by the first communications device, the second communications device, or the third communications device, and the computer software instruction includes a program used to perform the solutions according to the foregoing aspects.

According to a thirteenth aspect, an embodiment of this application provides a chip, configured to perform the methods according to the foregoing aspects. The chip may include a part having functions of a memory, a processor, a transmitter, a receiver, and/or a transceiver, and the memory stores an instruction, code, and/or data, to perform the methods according to the foregoing aspects.

According to a fourteenth aspect, an embodiment of this application provides a system. The system includes the first communications device, the second communications device, and the third communications device according to the foregoing aspects.

DESCRIPTION OF EMBODIMENTS

Figure 1:
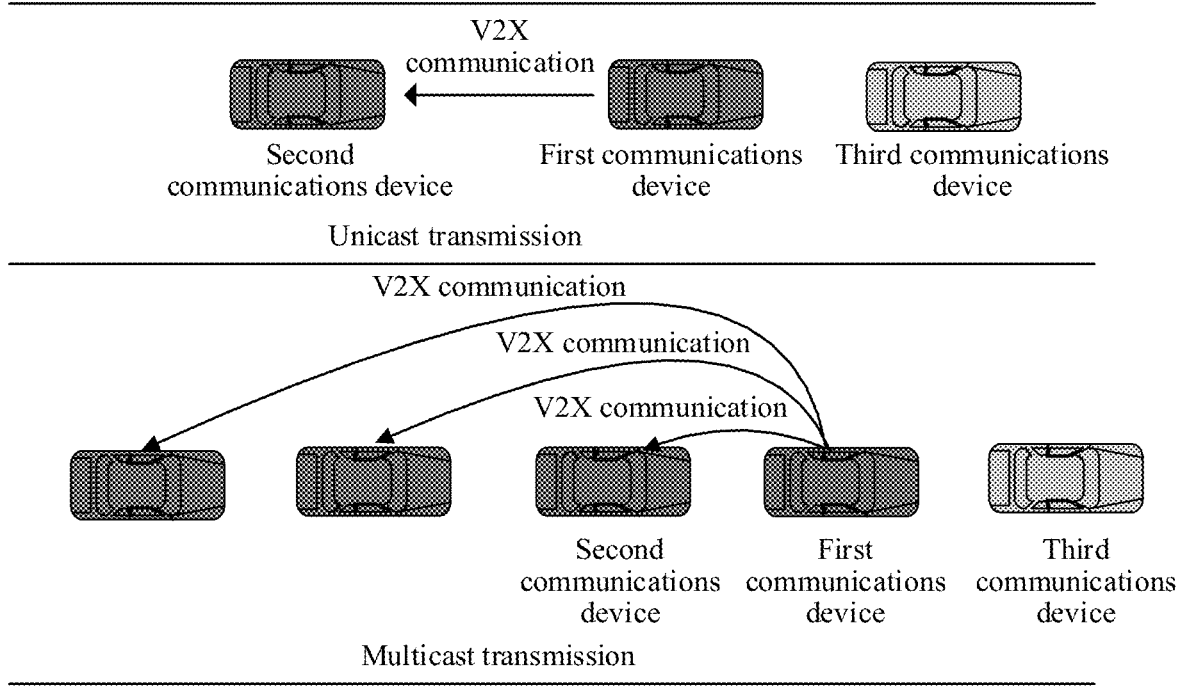
FIG. 1 is a schematic architectural diagram of a system according to an embodiment of this application.

In an example of unicast and multicast in V2X communication, in FIG. 1, modes of communication between a first communications device and a second communications device includes a unicast mode and a multicast mode. The first communications device performs V2X communication with the second communications device, and information about the V2X communication includes sidelink control information and sidelink data that are transmitted by the first communications device to the second communications device. When the first communications device is within coverage of a network device, a resource used for sidelink information transmission may be configured by the network device, or may be autonomously selected by the first communications device. When the first communications device is not within coverage of a network device, a resource used for sidelink information transmission may be autonomously selected by the first communications device. The first communications device and the second communications device belong to a first communications device group, and a third communications device is a device outside the first communications device group to which the first communications device and the second communications device belong.

There may be one or more "second communications devices" and "third communications devices" in this application. If there is one second communications device, communication between the first communications device and the second communications device is in a unicast mode. If there are a plurality of second communications devices, communication between the first communications device and the second communications devices is in a multicast mode, and the first communications device performs V2X communication with the plurality of second communications devices. If there are a plurality of third communications devices, there are a plurality of communications devices different from the second communications device in a unicast mode, and there are a plurality of devices outside the first communications device group in a multicast mode. For ease of description, a case of one second communications device and one third communications device is used as an example for description in the present invention. However, a quantity of the second communications devices and a quantity of the third communications devices in the present invention are not limited thereto.

The network device in this application is an apparatus that is deployed in a radio access network and that is configured to provide a wireless communication function for the first communications device and the second communications device. The network device may be a base station (Base Station, BS), for example, a macro base station, a micro base station, a relay station, or an access point, or may be a device in another form, for example, a street lamp or a road side unit (Road Side Unit, RSU). In systems using different radio access technologies, a device having a network device function may be termed differently. For example, in a 5th generation 5G network, the device is a network device or a base station; in a long term evolution (Long Term Evolution, LTE) network, the device is referred to as an evolved NodeB (evolved NodeB, eNB or eNodeB for short); in a 3rd generation 3G network, the device is referred to as a NodeB (NodeB) or the like; or the device is an RSU in V2X communication, or a chip or a system on chip (System on Chip, SOC) in the network device or the base station. For ease of description, in this application, the foregoing apparatus that provides the wireless communication function for the first to third communications devices is collectively referred to as the network device.

The first to third communications devices and the network device in this application may include various devices having a wireless communication function or units, components, apparatuses, chips, or SOCs in the devices. The device having the wireless communication function may be, for example, a vehicle-mounted device, a wearable device, a computing device or another device connected to a wireless modem, a mobile station (Mobile station, MS), a terminal (terminal), or user equipment (User Equipment, UE).

All or some of the embodiments of this application may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

With reference to specific examples, the following describes the embodiments of this application in more detail by using the first communications device, the second communications device, and the third communications device as examples.

Figure 2:
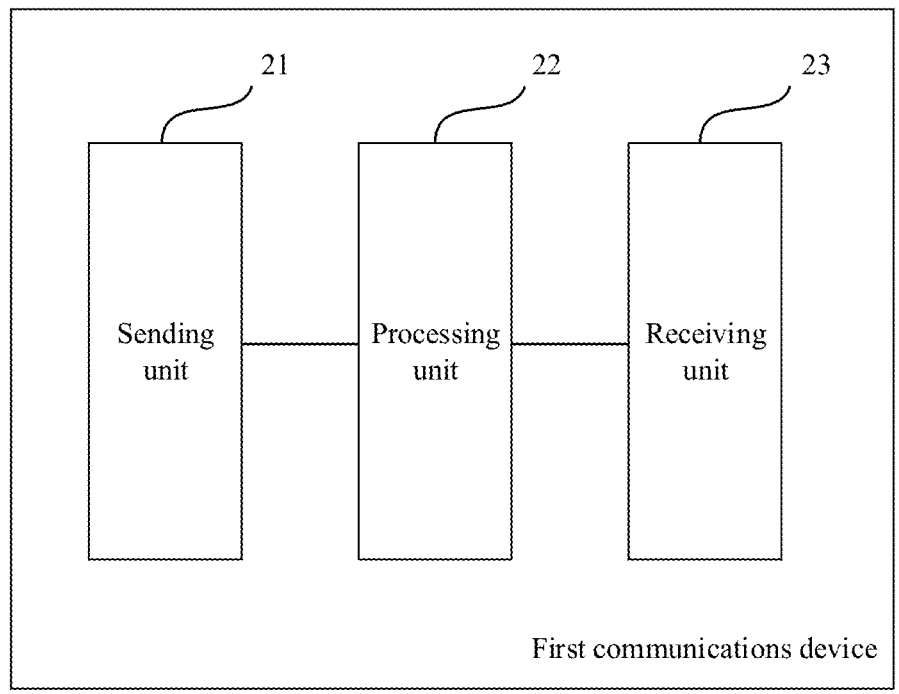
FIG. 2 is a schematic diagram of a first communications device according to an embodiment of this application.
Figure 3:
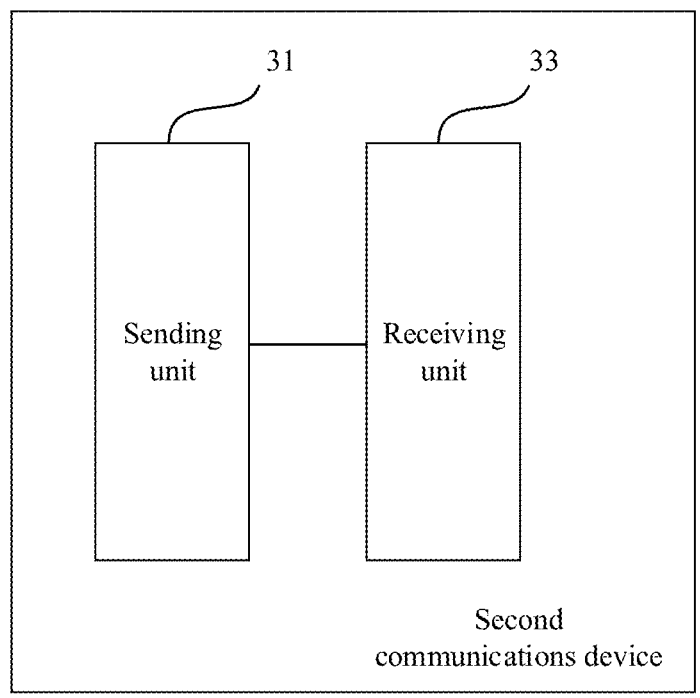
FIG. 3 is a schematic diagram of a second communications device according to an embodiment of this application.
Figure 4:
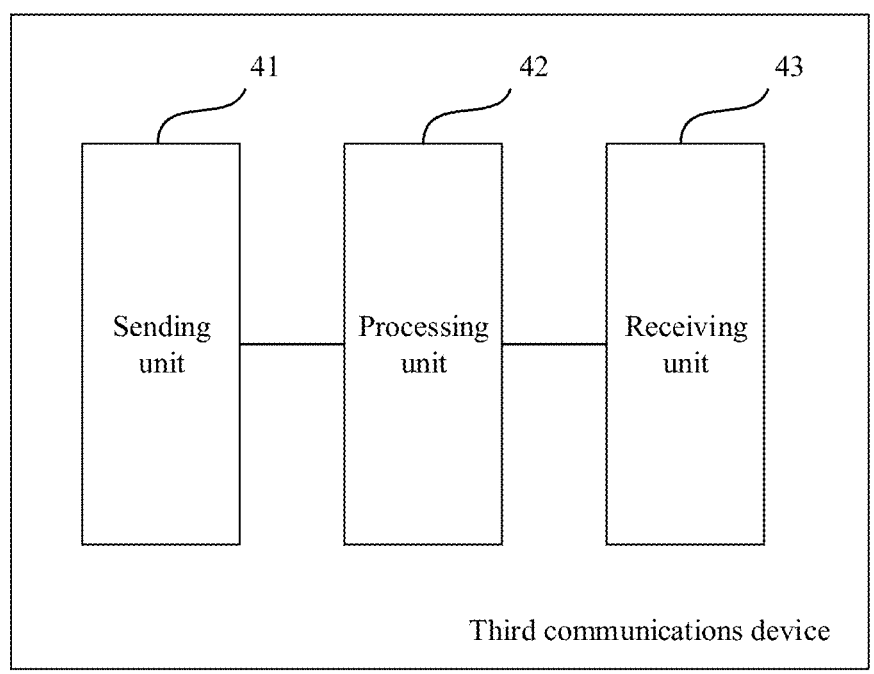
FIG. 4 is a schematic diagram of a third communications device according to an embodiment of this application.
Figure 5:
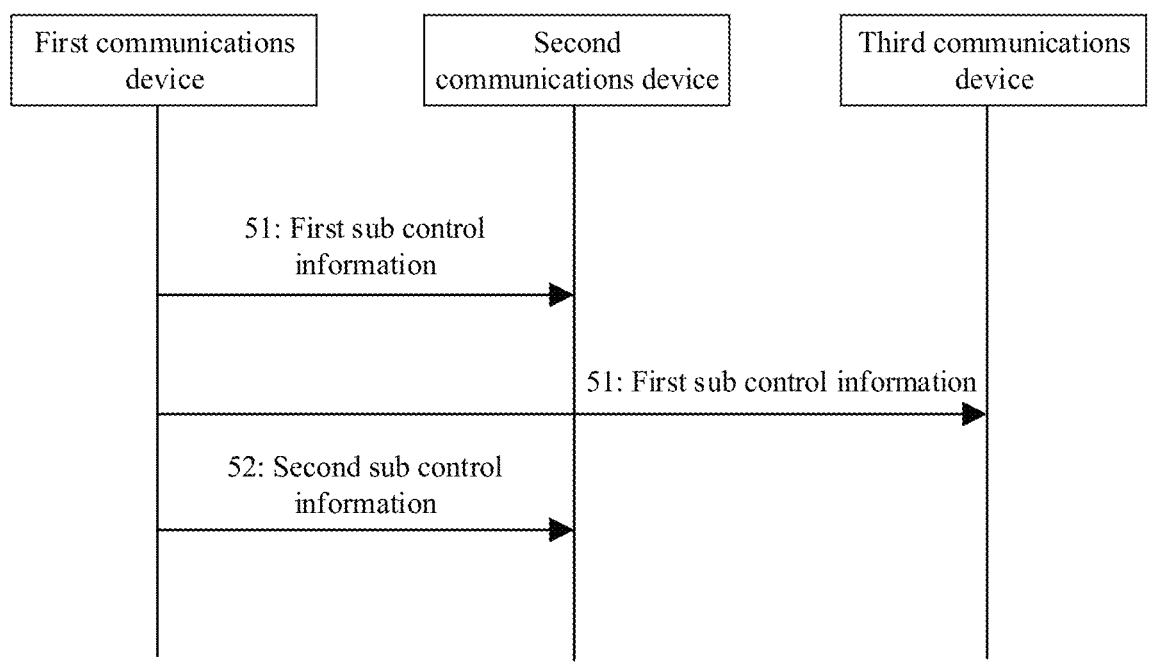
FIG. 5 is a schematic diagram of a sidelink control information transmission method, a first communications device, a second communications device, a third communications device, and a system according to an embodiment of this application.

FIG. 5 is a sidelink control information transmission method, a first communications device, a second communications device, a third communications device, and a system according to an embodiment of this application. As shown in FIG. 2, the first communications device includes a sending unit 21, a processing unit 22, and a receiving unit 23. The sending unit 21 and the receiving unit 23 may be replaced with a transceiver unit. As shown in FIG. 3, the second communications device includes a sending unit 31 and a receiving unit 33, and may further include a processing unit 32. The sending unit 31 and the receiving unit 33 may be replaced with a transceiver unit. As shown in FIG. 4, the third communications device includes a sending unit 41, a processing unit 42, and a receiving unit 43. The sending unit 41 and the receiving unit 43 may be replaced with a transceiver unit.

When the first to third communications devices are terminal devices or user equipments, and when a network device is a base station, the processing unit 22 to the processing unit 42 may be processors; the sending unit 21 to the sending unit 41 and the receiving unit 23 to the receiving unit 43 may be transceivers; the sending unit 21 to the sending unit 41 may be transmitters; and the receiving unit 23 to the receiving unit 43 may be receivers. The transceiver, the transmitter, or the receiver may be a radio frequency circuit. When the first communications device, the second communications device, or the third communications device includes a storage unit, the storage unit is configured to store a computer instruction. The processor is communicatively connected to the storage unit, and the processor executes the computer instruction stored in the memory, so that the first communications device, the second communications device, or the third communications device performs the method according to the embodiment in FIG. 5. The processor may be a general-purpose central processing unit (CPU), a microprocessor, or an application-specific integrated circuit (Application-Specific Integrated Circuit, ASIC).

When each of the first to third communications devices or the network device is a chip, the processing unit 22 to the processing unit 42 may be, for example, processors; the sending unit 21 to the sending unit 41 may be output interfaces, pins, circuits, or the like; the receiving unit 23 to the receiving unit 43 may be input interfaces, pins, circuits, or the like; and the transceiver units may be, for example, input/output interfaces, pins, circuits, or the like. The processing unit may execute a computer-executable instruction stored in a storage unit, so that a chip in each of the first to third communications devices or the network device performs the method in FIG. 5. Optionally, the storage unit is a storage unit in the chip, for example, a register or a buffer, or the storage unit may be a storage unit in the terminal but outside the chip, for example, a read-only memory (Read-Only Memory, ROM), another type of static storage device that can store static information and an instruction, or a random access memory (Random Access Memory, RAM).

Specific steps in the embodiment in FIG. 5 are as follows.

Step 51: The sending unit 21 of the first communications device sends first sub control information to the second communications device and the third communications device, and the receiving unit 33 of the second communications device and the receiving unit 43 of the third communications device receives the first sub control information from the first communications device, where the first sub control information is scrambled by using a common scrambling sequence, the first communications device and the second communications device belong to a first communications device group, the third communications device does not belong to the first communications device group, the first sub control information belongs to first sidelink control information, the first sidelink control information is used to indicate the first communications device to send first sidelink data to the second communications device, the first sub control information includes transmission resource indication information of the first sidelink data, and the transmission resource indication information of the first sidelink data is used to indicate a resource used by the first communications device to send the first sidelink data. In this embodiment, the second communications device and the third communications device are used as an example. Actually, the sending unit 21 of the first communications device may further send the first sub control information to a communications device other than the second communications device and the third communications device. The common scrambling sequence is generated by using a fixed initial value. For example, the initial value may be 510. Because the first sub control information is scrambled by using the common scrambling sequence, the second communications device and the third communications device may descramble the scrambled first sub control information by using the common scrambling sequence, to obtain the first sub control information. The first sub control information is a part of the first sidelink control information sent by the first communications device to the second communications device, and the first sub control information may be resource information that is in the first sidelink control information and that is used to indicate the first communications device to send the first sidelink data. The first sub control information may include at least one piece of information in transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index, and the first sub control information may further include another control field used to indicate the resource information. After obtaining the first sub control information, the second communications device may receive the first sidelink data based on the transmission resource indication information that is of the first sidelink data and that is indicated by the first sub control information.

Step 52: The sending unit 21 of the first communications device sends second sub control information to the second communications device, and the receiving unit 33 of the second communications device receives the second sub control information from the first communications device, where the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information. In this embodiment, the second communications device is used as an example. Actually, the sending unit 21 of the first communications device may further send the second sub control information to a communications device other than the second communications device. When communication between the first communications device and the second communications device is unicast transmission, the second sub control information is scrambled by using the scrambling sequence generated by using the user equipment identifier of the second communications device. Therefore, only the second communications device can descramble the second sub control information. However, the third communications device cannot learn of information about the user equipment identifier of the second communications device, and consequently, cannot descramble the second sub control information. When communication between the first communications device and the second communications device is multicast transmission, the second sub control information is scrambled by using the scrambling sequence generated by using the group identifier of the first communications device group. Because another device in the first communications device group learns of the group identifier of the first communications device group in advance, the another device can also descramble the second sub control information. However, because the third communications device outside the first communications device group cannot learn of the group identifier of the first communications device group, the third communications device cannot descramble the second sub control information. The second sub control information may include at least one piece of information in a modulation and coding scheme, a new data indicator, a transmission mode, a reserved information bit, a hybrid automatic repeat request process number, or a channel state feedback indicator. The second sub control information may further include another control field.

The second communications device can obtain all content of the first sidelink control information by obtaining the first sub control information and the second sub control information, and therefore, can receive and obtain the first sidelink data. After obtaining the first sub control information, the third communications device determines a fourth resource based on the first sub control information, where the fourth resource includes the resource used by the first communications device to send the first sidelink data. The fourth resource may further include a resource occupied for sending the first sub control information, and resource allocation information and resource reservation information that are indicated in the first sub control information. When a resource occupied by the first sidelink control information is of a fixed size, the fourth resource may further include a resource occupied for sending the second sub control information. When the third communications device is beyond network coverage, the processing unit 42 of the third communications device determines a fifth resource in a resource pool based on the fourth resource, where the fifth resource does not include the fourth resource, and the fifth resource is used by the third communications device to transmit sidelink information. By perceiving the fourth resource, the third communications device selects, from the resource pool, the fifth resource that does not include the fourth resource, to avoid a transmission failure caused by a resource conflict when sending or receiving the sidelink information by using the fifth resource. When the third communications device is within coverage of the network device, the third communications device sends first indication information to the network device, where the first indication information is used to indicate the fourth resource. The network device performs better scheduling based on a usage status of the fourth resource.

Before step 51, when the first communications device is in the network coverage, the receiving unit 23 of the first communications device receives first downlink control information from the network device, where the first downlink control information is used to indicate a first resource, and the first resource includes a second resource and a third resource. When the first communications device is beyond the network coverage, the processing unit 22 of the first communications device selects a first resource from the resource pool, where the first resource includes a second resource and a third resource. That the first communications device sends the first sub control information to the second communications device and the third communications device includes: The first communications device sends the first sub control information to the second communications device and the third communications device on the second resource. That the first communications device sends the second sub control information to the second communications device includes: The first communications device sends the second sub control information to the second communications device on the third resource. The first sub control information and the second sub control information are separately mapped to a resource block of a fixed size, and the size of the resource block is related to a quantity of bits included in the first sub control information and the second sub control information, a modulation and coding scheme, and a bit rate. For example, the first sub control information may include a field part with a fixed quantity of bits and a field part with a variable quantity of bits. In an example of LTE-V2X sidelink control information, the field part with the fixed quantity of bits includes a priority information field, a resource reservation information field, time interval information fields for initial transmission and retransmission, and a retransmission index field. The priority information field may be 3 bits, the resource reservation information field may be 4 bits, the time interval information fields for initial transmission and retransmission may be 4 bits, and the retransmission index field may be 1 bit, so a total quantity of bits may be 12 bits. The field part with the variable quantity of bits includes frequency domain resource information fields for initial transmission and retransmission, and a quantity of bits of the frequency domain resource information fields for initial transmission and retransmission depends on configuration of a size of a frequency domain resource allocated to sidelink transmission and a size of a subchannel. Therefore, a quantity of bits included in the first sub control information can be learned of by using a bandwidth configured for sidelink information transmission and a bandwidth of the subchannel. In an example in which a bandwidth for the sidelink information transmission is 20 MHz. When a subcarrier spacing is 15 kHz, there are 110 resource blocks (Resource Block, RB) in total in frequency domain. If one subchannel includes 4 RBs, there may be 27 subchannels in total. In this case, 9 bits are required to indicate a frequency domain resource for sidelink transmission, and the first sub control information includes 21 bits in total. A quantity of bits included in the second sub control information may be 6 bits, the modulation and coding scheme may be 5 bits, and the transmission mode may be one bit. If a bit rate of the control information is set to 0.1, and when quadrature phase shift keying (Quadrature Phase Shift Keying, QPSK) modulation is used, the first sub control information is mapped to 105 resource units, and the second sub control information is mapped to 30 resource units.

Figure 6A:
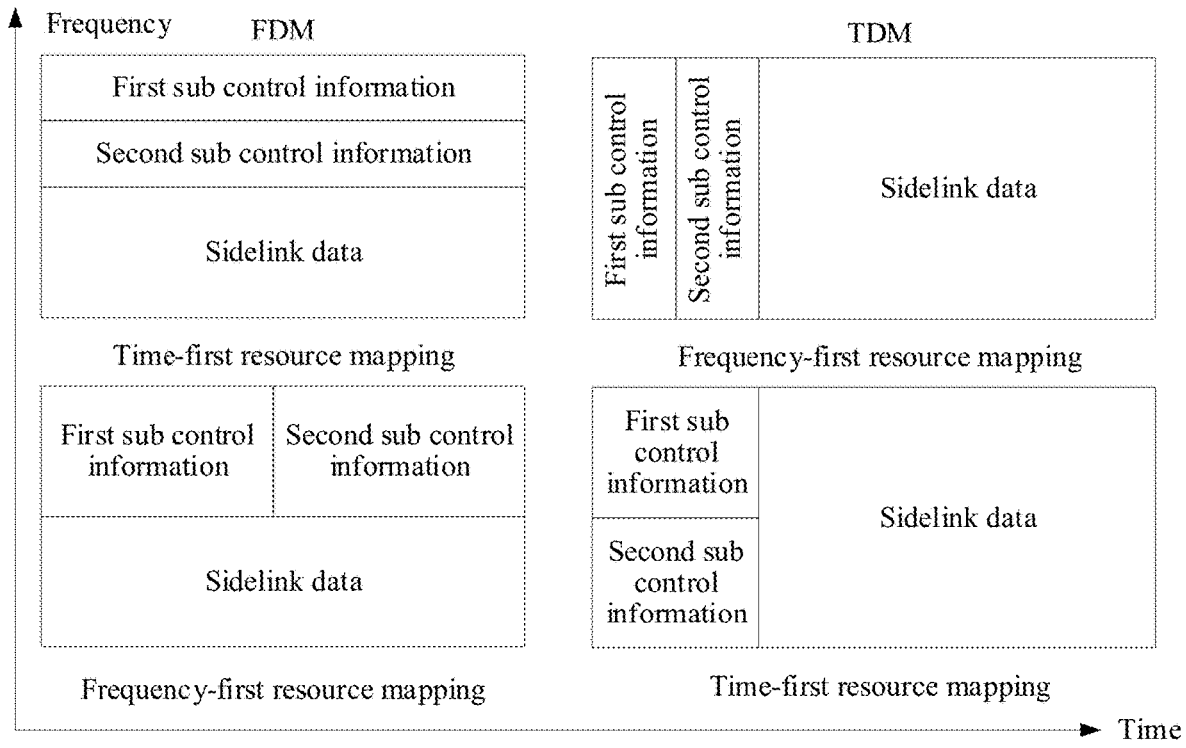
FIG. 6A and FIG. 6B are a schematic diagram of a sidelink information resource configuration method according to an embodiment of this application.
Figure 6B:
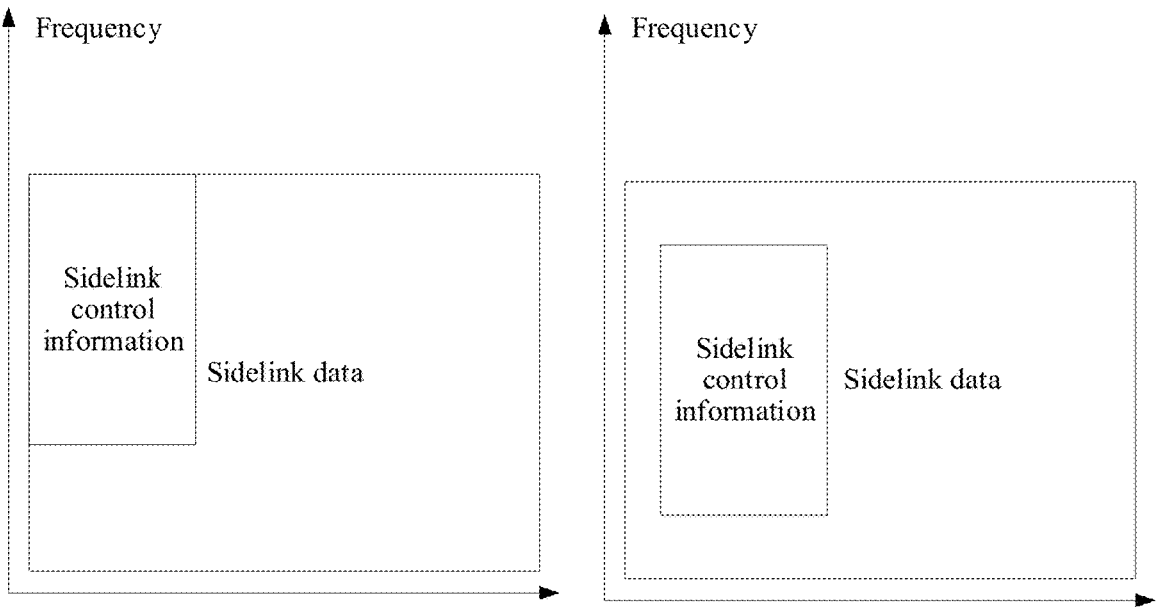

When resource multiplexing statuses of the sidelink control information and the sidelink data are respectively frequency division multiplexing (Frequency Division Multiplexing, FDM) and time division multiplexing (Time Division Multiplexing), resource occupation statuses of the first sub control information and the second sub control information may be shown in FIG. 6A. The resource mapping of the sidelink control information may be in a time-first or frequency-first manner. In an actual application, the resource multiplexing statuses of the sidelink control information and the sidelink data may alternatively be in another form. For example, the sidelink control information does not necessarily occupy a same quantity of symbols or a same frequency bandwidth as that of the sidelink data. The sidelink control information and the sidelink data may overlap in terms of time and be orthogonal in terms of frequency, as shown in FIG. 6B. The resource occupation statuses of the first sub control information and the second sub control information may alternatively be in another form. It should be noted that the resource multiplexing statuses of the sidelink control information and the sidelink data in FIG. 6B may be specific to a single communications device, or may be specific to a plurality of communications devices. For a plurality of communications devices, to be specific, the sidelink control information in FIG. 6B includes a plurality of pieces of first sub control information and second sub control information that are of the plurality of communications devices, the plurality of pieces of first sub control information of the plurality of communications devices are arranged at adjacent locations, and the plurality of pieces of second sub control information of the plurality of communications devices are arranged at adjacent locations. A size of resources actually occupied by the first sub control information and the second sub control information is determined based on the foregoing descriptions. The first sub control information and the second sub control information do not necessarily occupy all OFDM symbols in a sidelink control information resource or all resource elements (RE, resource element) in a bandwidth. The FDM in FIG. 6A is used as an example for description. For example, the sidelink control information occupies one slot and time-frequency resources of two physical resource blocks (physical resource block, PRB), and the slot may include 14 symbols. In this case, during time-first resource mapping, a part of the 14 symbols may be used to transmit the first sub control information, and the remaining part may be used to transmit the second sub control information. During frequency-first resource mapping, a part of REs in the two PRBs (24 REs) may be used to transmit the first sub control information, and the remaining part of the REs may be used to transmit the second sub control information. Another case is similar to this case, and details are not described herein.

Figure 7A:
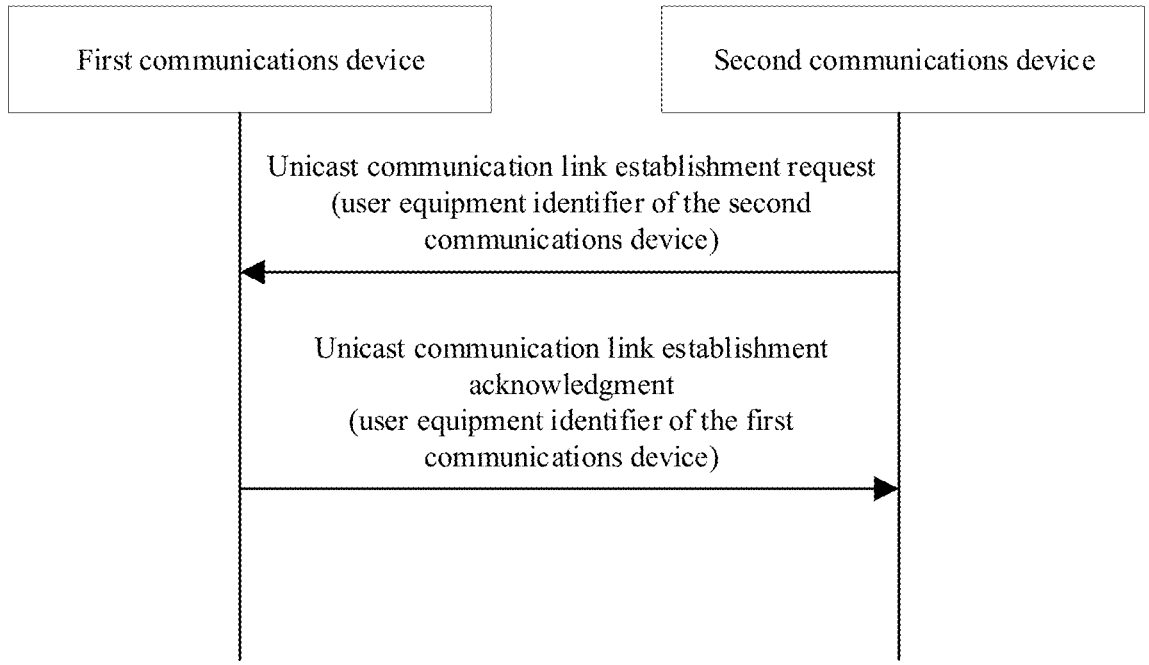
FIG. 7A and FIG. 7B are a schematic diagram of a unicast communication link establishment method, a first communications device, and a second communications device according to an embodiment of this application.

Before step 51, the first communications device and the second communications device establish a unicast communication link, as shown in FIG. 7. In FIG. 7A, the sending unit 31 of the second communications device sends a unicast communication link establishment request to the first communications device, and the receiving unit 23 of the first communications device receives the unicast communication link establishment request from the second communications device, where the unicast communication link establishment request includes the user equipment identifier of the second communications device.

The sending unit 21 of the first communications device sends unicast communication link establishment acknowledgment information to the second communications device, and the receiving unit 33 of the second communications device receives the unicast communication link establishment acknowledgment information from the first communications device, where the unicast communication link establishment acknowledgment information includes a user equipment identifier of the first communications device.

Figure 7B:
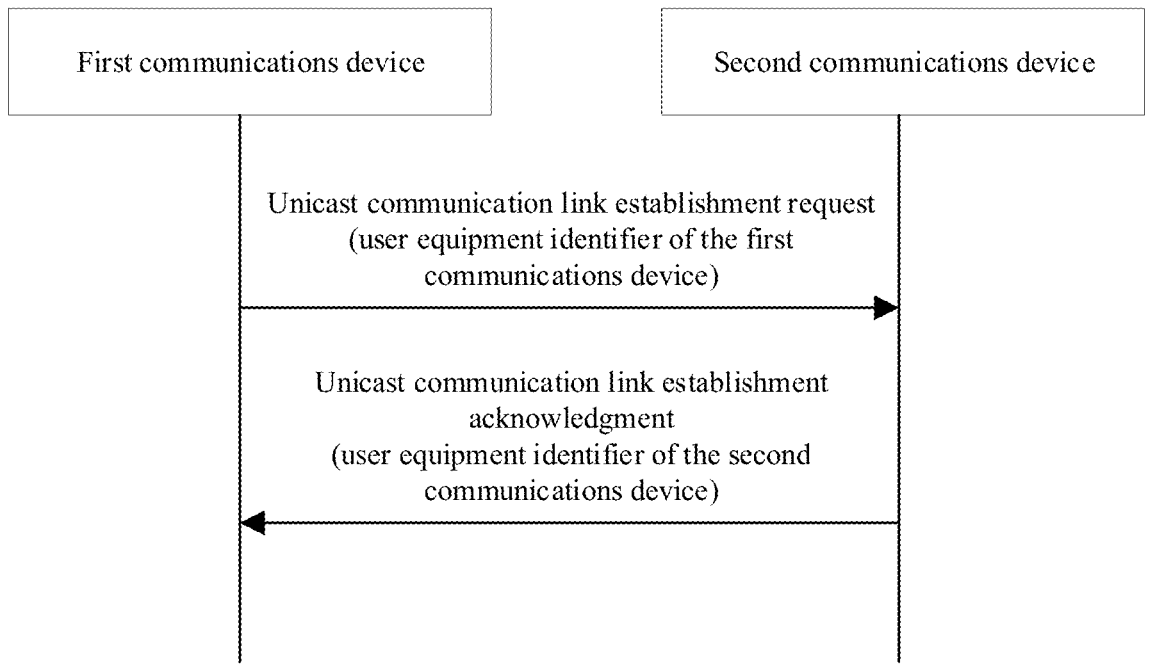

In FIG. 7B, the sending unit 21 of the first communications device sends unicast communication link establishment request to the second communications device, and the receiving unit 33 of the second communications device receives the unicast communication link establishment request from the first communications device, where the unicast communication link establishment request includes a user equipment identifier of the first communications device.

The sending unit 31 of the second communications device sends unicast communication link establishment acknowledgment information to the first communications device, and the receiving unit 23 of the first communications device receives the unicast communication link establishment acknowledgment information from the second communications device, where the unicast communication link establishment acknowledgment information includes the user equipment identifier of the second communications device.

In addition to the user equipment identifier of the first communications device or the second communications device, the unicast communication link establishment request and the unicast communication link establishment acknowledgment information may further include other information about the first communications device or the second communications device.

Figure 8A:
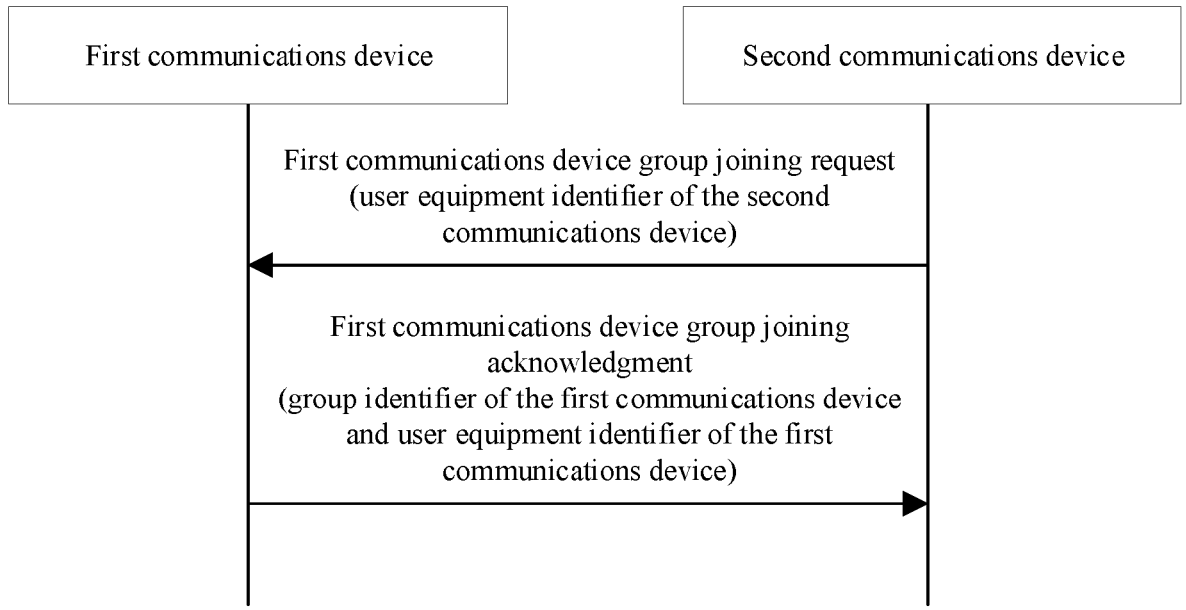
FIG. 8A and FIG. 8B are a schematic diagram of a multicast communication link establishment method, a first communications device, and a second communications device according to an embodiment of this application.

The first communications device and the second communications device establish a multicast communication link, as shown in FIG. 8. In FIG. 8A, the sending unit 31 of the second communications device sends first communications device group joining request information to the first communications device, and the receiving unit 23 of the first communications device receives the first communications device group joining request information from the second communications device, where the first communications device group joining request information includes the user equipment identifier of the second communications device.

The sending unit 21 of the first communications device sends first communications device group joining acknowledgment information to the second communications device, and the receiving unit 33 of the second communications device receives the first communications device group joining acknowledgment information from the first communications device, where the first communications device group joining acknowledgment information includes the group identifier of the first communications device group and the user equipment identifier of the first communications device.

Figure 8B:
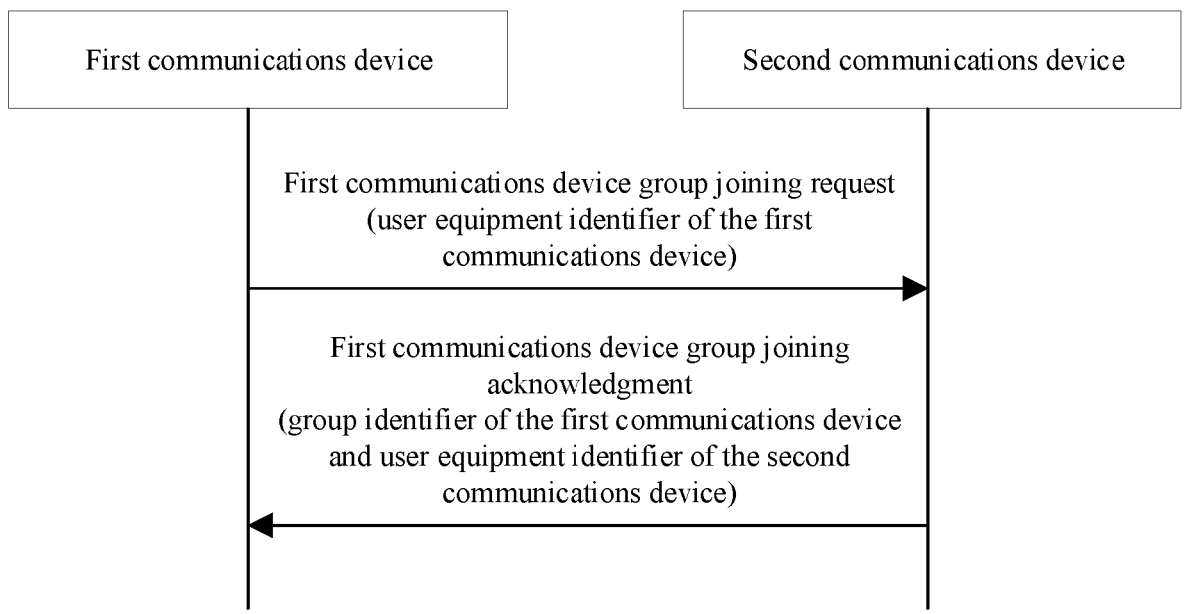

In FIG. 8B, the sending unit 21 of the first communications device sends first communications device group joining request information to the second communications device, and the receiving unit 33 of the second communications device receives the first communications device group joining request information from the first communications device, where the first communications device group joining request information includes a user equipment identifier of the first communications device. The sending unit 31 of the second communications device sends first communications device group joining acknowledgment information to the first communications device, and the receiving unit 23 of the first communications device receives the first communications device group joining acknowledgment information from the second communications device, where the first communications device group joining acknowledgment information includes the group identifier of the first communications device group and the user equipment identifier of the second communications device.

In addition to the user equipment identifier of the first communications device or the second communications device, the first communications device group joining request information may further include other information about the first communications device or the second communications device. The first communications device group joining acknowledgment information may further include a user equipment identifier of another communications device in the first communications device group.

The sending unit 21 of the first communications device sends sidelink control information to the second communications device, and the receiving unit 33 of the second communications device receives the sidelink control information from the first communications device, where the first communications device and the second communications device belong to the first communications device group, and the sidelink control information includes the user equipment identifier of the second communications device or the group identifier of the first communications device group.

Communication between the first communications device and the second communications device is unicast transmission, and the sidelink control information includes the user equipment identifier of the second communications device; or communication between the first communications device and the second communications device is multicast transmission, and the sidelink control information includes the group identifier of the first communications device group.

What is claimed is:
1. A sidelink control information sending method, comprising:
sending, by a first communications device, first sub control information to a second communications device and a third communications device, wherein the first sub control information is scrambled by using a common scrambling sequence, the first communications device and the second communications device belong to a first communications device group, the third communications device does not belong to the first communications device group, the first sub control information belongs to first sidelink control information, the first sidelink control information is used to indicate the first communications device to send first sidelink data to the second communications device, the first sub control information comprises transmission resource indication information of the first sidelink data, and the transmission resource indication information of the first sidelink data is used to indicate a resource used by the first communications device to send the first sidelink data; and sending, by the first communications device, second sub control information to the second communications device, wherein the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

2. The method according to claim 1, wherein:
the first sub control information comprises at least one of transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and
the second sub control information comprises at least one of a modulation and coding scheme, a new data indicator, a transmission mode, a reserved information bit, a hybrid automatic repeat request process number, or a channel state feedback indicator.

3. The method according to claim 1, comprising:
receiving, by the first communications device, first communications device group joining request information from the second communications device, wherein the first communications device group joining request information comprises the user equipment identifier of the second communications device; and
sending, by the first communications device, first communications device group joining acknowledgment information to the second communications device, wherein the first communications device group joining acknowledgment information comprises the group identifier of the first communications device group and a user equipment identifier of the first communications device; or
sending, by the first communications device, first communications device group joining request information to the second communications device, wherein the first communications device group joining request information comprises a user equipment identifier of the first communications device; and receiving, by the first communications device, first communications device group joining acknowledgment information from the second communications device, wherein the first communications device group joining acknowledgment information comprises the group identifier of the first communications device group and the user equipment identifier of the second communications device.

4. The method according to claim 1, comprising:
receiving, by the first communications device, first downlink control information from a network device, wherein the first downlink control information is used to indicate a first resource, and wherein the first resource comprises a second resource and a third resource; or
selecting, by the first communications device, a first resource from a resource pool, wherein the first resource comprises a second resource and a third resource;
wherein the sending, by a first communications device, first sub control information to a second communications device and a third communications device comprises sending, by the first communications device, the first sub control information to the second communications device and the third communications device on the second resource; and
wherein the sending, by the first communications device, second sub control information to the second communications device comprises sending, by the first communications device, the second sub control information to the second communications device on the third resource.

5. A sidelink control information receiving method, comprising:
receiving, by a second communications device, first sub control information from a first communications device, wherein the first sub control information is scrambled by using a common scrambling sequence, the first communications device and the second communications device belong to a first communications device group, the first sub control information belongs to first sidelink control information, the first sidelink control information is used to indicate the first communications device to send first sidelink data to the second communications device, the first sub control information comprises transmission resource indication information of the first sidelink data, and the transmission resource indication information of the first sidelink data is used to indicate a resource used by the first communications device to send the first sidelink data; and receiving, by the second communications device, second sub control information from the first communications device, wherein the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

6. The method according to claim 5, wherein:
the first sub control information comprises at least one of transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and the second sub control information comprises at least one of a modulation and coding scheme, a new data indicator, a transmission mode, a reserved information bit, a hybrid automatic repeat request process number, or a channel state feedback indicator.

7. The method according to claim 5, comprising:
receiving, by the second communications device, first communications device group joining request information from the first communications device, wherein the first communications device group joining request information comprises a user equipment identifier of the first communications device; and
sending, by the second communications device, first communications device group joining acknowledgment information to the first communications device, wherein the first communications device group joining acknowledgment information comprises the group identifier of the first communications device group and the user equipment identifier of the second communications device; or
sending, by the second communications device, first communications device group joining request information to the first communications device, wherein the first communications device group joining request information comprises the user equipment identifier of the second communications device; and
receiving, by the second communications device, first communications device group joining acknowledgment information from the first communications device, wherein the first communications device group joining acknowledgment information comprises the group identifier of the first communications device group and the user equipment identifier of the first communications device.

8. A sidelink control information receiving method, comprising:
receiving, by a third communications device, first sub control information from a first communications device, wherein the first sub control information is scrambled by using a common scrambling sequence, the first communications device belongs to a first communications device group, the third communications device does not belong to the first communications device group, the first sub control information belongs to first sidelink control information, the first sidelink control information is used to indicate the first communications device to send first sidelink data to the third communications device, the first sidelink control information comprises second sub control information different from the first sub control information, the second sub control information is scrambled by using a scrambling sequence generated by using a user equipment identifier of a second communications device or a scrambling sequence generated by using a group identifier of the first communications device group, the first sub control information comprises transmission resource indication information of the first sidelink data, and the transmission resource indication information of the first sidelink data is used to indicate a resource used by the first communications device to transmit the first sidelink data; and
determining, by the third communications device, a first resource based on the first sub control information, wherein the first resource comprises a resource used by the first communications device to send the first sidelink data.

9. The method according to claim 8, wherein the first sub control information comprises at least one of transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index.

10. The method according to claim 8, comprising:
determining, by the third communications device, a second resource in a resource pool based on the first resource, wherein the second resource does not comprise the first resource, and wherein the second resource is used by the third communications device to transmit sidelink information.

11. A first communications device, comprising:
at least one processor; and
one or more memories coupled to the at least one processor and storing programming instructions for execution by the at least one processor to:
send first sub control information to a second communications device and a third communications device, wherein the first sub control information is scrambled by using a common scrambling sequence, the first communications device and the second communications device belong to a first communications device group, the third communications device does not belong to the first communications device group, the first sub control information belongs to first sidelink control information, the first sidelink control information is used to indicate the first communications device to send first sidelink data to the second communications device, wherein the first sub control information comprises transmission resource indication information of the first sidelink data, and the transmission resource indication information of the first sidelink data is used to indicate a resource used by the first communications device to send the first sidelink data; and
send second sub control information to the second communications device, the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

12. The device according to claim 11, wherein:
the first sub control information comprises at least one of transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and
the second sub control information comprises at least one of a modulation and coding scheme, a new data indicator, a transmission mode, a reserved information bit, a hybrid automatic repeat request process number, or a channel state feedback indicator.

13. The device according to claim 11, wherein the programming instructions are for execution by the at least one processor to:
receive first communications device group joining request information from the second communications device, wherein the first communications device group joining request information comprises the user equipment identifier of the second communications device; and
send first communications device group joining acknowledgment information to the second communications device, wherein the first communications device group joining acknowledgment information comprises the group identifier of the first communications device group and a user equipment identifier of the first communications device; or
send first communications device group joining request information to the second communications device, wherein the first communications device group joining request information comprises a user equipment identifier of the first communications device; and
receive first communications device group joining acknowledgment information from the second communications device, wherein the first communications device group joining acknowledgment information comprises the group identifier of the first communications device group and the user equipment identifier of the second communications device.

14. The device according to claim 11, wherein the programming instructions are for execution by the at least one processor to:
receive first downlink control information from a network device, wherein the first downlink control information is used to indicate a first resource, and wherein the first resource comprises a second resource and a third resource; or
select a first resource from a resource pool, wherein the first resource comprises a second resource and a third resource;
wherein the sending first sub control information to a second communications device and a third communications device comprises sending the first sub control information to the second communications device and the third communications device on the second resource; and
wherein the sending second sub control information to the second communications device comprises sending the second sub control information to the second communications device on the third resource.

15. A second communications device, comprising:
at least one processor; and
one or more memories coupled to the at least one processor and storing programming instructions for execution by the at least one processor to:
receive first sub control information from a first communications device, wherein the first sub control information is scrambled by using a common scrambling sequence, the first communications device and the second communications device belong to a first communications device group, the first sub control information belongs to first sidelink control information, the first sidelink control information is used to indicate the first communications device to send first sidelink data to the second communications device, the first sub control information comprises transmission resource indication information of the first sidelink data, and the transmission resource indication information of the first sidelink data is used to indicate a resource used by the first communications device to send the first sidelink data; and
receive second sub control information from the first communications device, wherein the second sub control information is scrambled by using a scrambling sequence generated by using a user equipment identifier of the second communications device or a scrambling sequence generated by using a group identifier of the first communications device group, the second sub control information belongs to the first sidelink control information, and the second sub control information is control information that is in the first sidelink control information and that is other than the first sub control information.

16. The device according to claim 15, wherein:
the first sub control information comprises at least one of transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index; and
the second sub control information comprises at least one of a modulation and coding scheme, a new data indicator, a transmission mode, a reserved information bit, a hybrid automatic repeat request process number, or a channel state feedback indicator.

17. The device according to claim 15, wherein the programming instructions are for execution by the at least one processor to:
receive first communications device group joining request information from the first communications device, wherein the first communications device group joining request information comprises a user equipment identifier of the first communications device; and
send first communications device group joining acknowledgment information to the first communications device, wherein the first communications device group joining acknowledgment information comprises the group identifier of the first communications device group and the user equipment identifier of the second communications device; or
send first communications device group joining request information to the first communications device, wherein the first communications device group joining request information comprises the user equipment identifier of the second communications device; and
receive first communications device group joining acknowledgment information from the first communications device, wherein the first communications device group joining acknowledgment information comprises the group identifier of the first communications device group and the user equipment identifier of the first communications device.

18. A third communications device, comprising:
at least one processor; and
one or more memories coupled to the at least one processor and storing programming instructions for execution by the at least one processor to:
  receive first sub control information from a first communications device, wherein the first sub control information is scrambled by using a common scrambling sequence, the first communications device belongs to a first communications device group, the third communications device does not belong to the first communications device group, the first sub control information belongs to first sidelink control information, the first sidelink control information is used to indicate the first communications device to send first sidelink data to the third communications device, the first sidelink control information comprises second sub control information different from the first sub control information, the second sub control information is scrambled by using a scrambling sequence generated by using a user equipment identifier of a second communications device or a scrambling sequence generated by using a group identifier of the first communications device group, the first sub control information comprises transmission resource indication information of the first sidelink data, and the transmission resource indication information of the first sidelink data is used to indicate a resource used by the first communications device to transmit the first sidelink data; and
  determine a first resource based on the first sub control information, wherein the first resource comprises a resource used by the first communications device to send the first sidelink data.

19. The device according to claim 18, wherein the first sub control information comprises at least one of transmission priority information, resource reservation information, frequency domain resources for initial transmission and retransmission, time interval information for initial transmission and retransmission, hybrid automatic repeat request acknowledgment or negative acknowledgment feedback resource reservation, frequency domain resources for initial hybrid automatic repeat request transmission or hybrid automatic repeat request retransmission, or a retransmission index.

20. The device according to claim 18, wherein the programming instructions are for execution by the at least one processor to:
  determine a second resource in a resource pool based on the first resource, wherein the second resource does not comprise the first resource, and wherein the second resource is used by the third communications device to transmit sidelink information.

* * * * *